(12) United States Patent
Hao

(10) Patent No.: US 10,674,017 B2
(45) Date of Patent: Jun. 2, 2020

(54) DATA COMMUNICATION CONTROL

(71) Applicant: Lenovo (Beijing) Co., Ltd., Beijing (CN)

(72) Inventor: Zhuangzhuang Hao, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 35 days.

(21) Appl. No.: 15/725,728

(22) Filed: Oct. 5, 2017

(65) Prior Publication Data

US 2018/0288234 A1 Oct. 4, 2018

(30) Foreign Application Priority Data

Mar. 28, 2017 (CN) .......................... 2017 1 0192664

(51) Int. Cl.
| | |
|---|---|
| *H04M 15/00* | (2006.01) |
| *H04W 8/18* | (2009.01) |
| *H04W 4/24* | (2018.01) |
| *H04M 17/02* | (2006.01) |

(52) U.S. Cl.
CPC ..... *H04M 15/8214* (2013.01); *H04M 15/751* (2013.01); *H04M 15/8038* (2013.01); *H04M 15/8044* (2013.01); *H04M 15/8055* (2013.01); *H04M 15/8083* (2013.01); *H04M 17/02* (2013.01); *H04W 4/24* (2013.01); *H04W 8/183* (2013.01)

(58) Field of Classification Search
CPC ..... H04W 8/183; H04W 12/06; H04W 8/205; H04W 4/24; H04W 4/60; H04W 48/18; H04W 84/042; H04M 15/8038; H04M 15/7556; H04M 15/8214; H04M 15/751; H04M 15/8044; H04M 15/8055; H04M 15/8083; H04M 17/02; H04M 4/24; H04L 67/306; H04N 21/2365; H04N 21/238; H04N 21/41407; H04N 21/41422; H04N 21/422; H04N 21/44209; H04N 21/488; H04N 21/6106; H04N 21/6112; H04N 21/6131; H04N 21/6137; H04N 21/6143; H04N 21/64723; H04N 21/64738

See application file for complete search history.

(56) References Cited

U.S. PATENT DOCUMENTS

| | | | |
|---|---|---|---|
| 9,949,111 B2 * | 4/2018 | Wane | H04W 4/50 |
| 2006/0205404 A1 * | 9/2006 | Gonen | H04W 8/06 455/432.1 |
| 2010/0311402 A1 * | 12/2010 | Srinivasan | H04W 8/183 455/418 |

(Continued)

FOREIGN PATENT DOCUMENTS

| | | | |
|---|---|---|---|
| CN | 104811975 A | * | 7/2015 |
| CN | 106304007 A | | 1/2017 |
| WO | 2015144088 A1 | | 10/2015 |

*Primary Examiner* — Matthew C Sams
(74) *Attorney, Agent, or Firm* — Anova Law Group, PLLC

(57) ABSTRACT

A method for controlling data communication includes receiving a request to register a terminal to a communication network, allocating a virtual card to the terminal for data communication, acquiring data usage information of the virtual card, and controlling use or reallocation of the virtual card according to the data usage information. The data usage information includes an amount of data consumed by the terminal through using the virtual card.

15 Claims, 6 Drawing Sheets

(56) References Cited

U.S. PATENT DOCUMENTS

| | | | |
|---|---|---|---|
| 2012/0108295 A1* | 5/2012 | Schell | H04W 4/50 455/558 |
| 2014/0245003 A1* | 8/2014 | Barker | H04L 63/08 713/168 |
| 2015/0215738 A1* | 7/2015 | Frusina | H04W 4/023 455/426.1 |
| 2015/0237457 A1* | 8/2015 | Yu | H04W 4/60 455/558 |
| 2016/0007190 A1* | 1/2016 | Wane | H04W 4/50 455/419 |
| 2016/0088464 A1* | 3/2016 | Hans | H04W 8/183 455/558 |
| 2016/0157085 A1* | 6/2016 | Yeoum | H04M 3/387 455/435.1 |
| 2016/0183081 A1* | 6/2016 | Flores Cuadrado | H04B 1/3816 455/558 |
| 2016/0241722 A1* | 8/2016 | Hao | H04W 12/04 |
| 2018/0020100 A1* | 1/2018 | Haggard | H04M 15/80 |
| 2018/0295500 A1* | 10/2018 | Yang | H04W 8/183 |

\* cited by examiner

DATA COMMUNICATION CONTROL

CROSS-REFERENCE TO RELATED APPLICATION

This application claims priority to Chinese Application No. 201710192664.6, filed on Mar. 28, 2017, the entire contents of which are incorporated herein by reference.

FIELD OF THE DISCLOSURE

The present disclosure generally relates to the field of communication and, more particularly, to a method and apparatus for controlling data communication as well as a management device and a mobile terminal.

BACKGROUND

With the development of intelligent terminals and wireless networking technologies, users may expect to access the Internet from different locations using a same terminal. While roaming, users may still need data communication services for browsing web pages via a mobile terminal, such as a mobile phone. Since different locations may be covered by different communication networks, users may need to pay expensive data roaming fees for data transfer, particularly when roaming abroad.

A data plan according to conventional technologies, which can provide a way for using data at a lower surcharge while roaming, is achieved through assigning a virtual SIM card from a carrier in a roaming area to the mobile terminal by the server. However, the user may not need to use the virtual SIM card for data services during the entire period abroad. Therefore, it is a waste of virtual SIM card resources when the user does not use the virtual SIM card, but still occupies it. Furthermore, the use of data may be different for different users. As such, a waste of virtual SIM card resources may occur to some extent, when the data of some virtual SIM cards are overused, i.e. exceeding an amount of data associated with the virtual SIM cards, while the data of other virtual SIM cards are not fully utilized.

SUMMARY

One aspect of the present disclosure provides a method for controlling data communication, including receiving a request to register a terminal to a communication network, allocating a virtual card to the terminal for data communication, acquiring data usage information of the virtual card, and controlling use or reallocation of the virtual card according to the data usage information. The data usage information includes an amount of data consumed by the terminal through using the virtual card.

Another aspect of the present disclosure provides a method for controlling data communication including establishing a communication connection between a terminal and a management device, receiving information of a virtual card, initiating the virtual card for data communication, sending data usage information of the virtual card to the management device, and controlling use of the virtual card according to a control instruction issued by the management device. The data usage information includes an amount of data consumed by the terminal through using the virtual card.

Another aspect of the present disclosure provides a management device including a transceiver, a memory storing a computer program, and a processor coupled to the transceiver and the memory. The processor executes the computer program to receive, through the transceiver, a request to register a terminal to a communication network, allocate a virtual card to the terminal for data communication, acquire, through the transceiver, data usage information of the virtual card, and control, through the transceiver, use or reallocation of the virtual card according to the data usage information. The data usage information includes an amount of data consumed by the terminal through using the virtual card.

Another aspect of the present disclosure provides a terminal comprising a transceiver, a memory storing a computer program, and a processor coupled to the transceiver and the memory. The processor executes the computer program to establish a communication connection between the terminal and a management device through the transceiver, receive information of a virtual card from the management device, initiate the virtual card for data communication, send data usage information of the virtual card to the management device, and control use of the virtual card according to a control instruction issued by the management device. The data usage information includes an amount of data consumed by the terminal through using the virtual card.

BRIEF DESCRIPTION OF THE DRAWINGS

In order to provide a clearer illustration of the technical solution of embodiments of the present disclosure, brief descriptions of the drawings of the present disclosure are provided. The following drawings are merely examples for illustrative purposes according to various disclosed embodiments. Other drawings will be apparent to those skilled in the art from consideration of the drawing of the embodiments disclosed herein.

DETAILED DESCRIPTION

In order to provide a better understanding of the present disclosure for those skilled in the art, embodiments of the present disclosure are described in detail with reference to the drawings. It is apparent that the disclosed embodiments are merely example embodiments of the present disclosure, but not all of embodiments of the present disclosure. Other embodiments of the disclosure will be apparent to those skilled in the art from consideration of the specification and practice of the embodiments disclosed herein, which are intended to be within the scope of the disclosure.

The terms "first," "second," or the like in the specification, claims, and the drawings of the present disclosure are merely used to distinguish similar elements, and are not intended to describe a specified order or a sequence. The involved elements may be interchangeable in any suitable situation, so that the present disclosure can be performed in the order or sequence different from that shown in the figures or described in the specification. In addition, the terms "including," "comprising," and variations thereof herein are open, non-limiting terminologies, which are meant to encompass a series of steps of processes and methods, or a series of units of systems, apparatus, or devices listed thereafter and equivalents thereof as well as additional steps of the processes and methods or units of the systems, apparatus, or devices.

Figure 1:
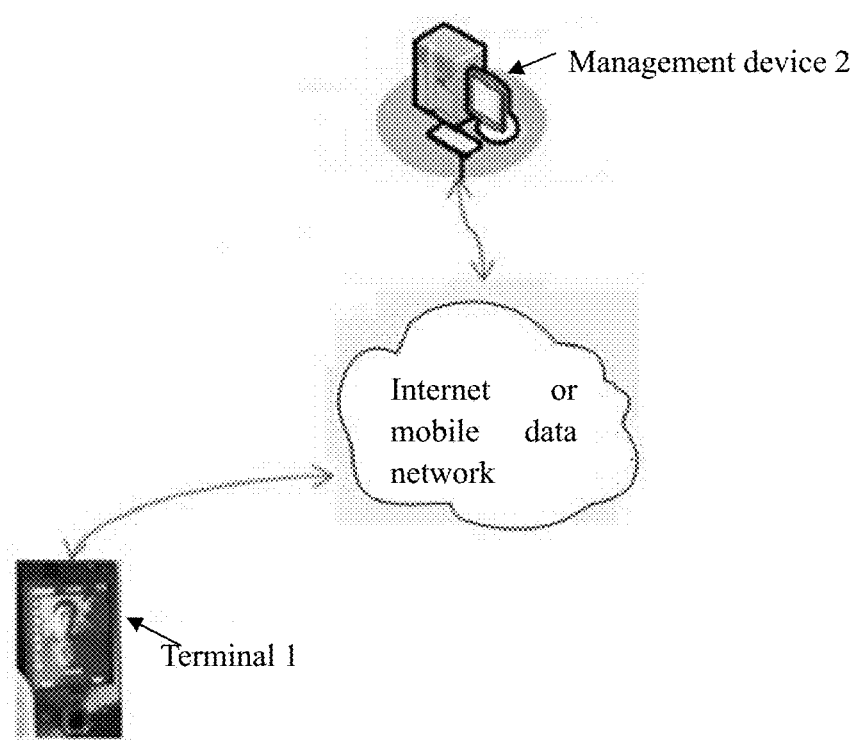
FIG. 1 is a schematic diagram of a communication architecture for data communication according to the present disclosure.

FIG. 1 is a schematic diagram of a communication architecture for data communication according to the present disclosure. The communication architecture includes a communication network, a terminal 1 connected to the communication network, and a management device 2. The terminal 1 may be one of a variety of mobile terminals, such as a mobile phone, a tablet, or a notebook, and in one of various forms, such as portable-type, pocket-type, hand-held type, computer built-in type, or vehicle-mounted type. The management device 2 may be any management device connected to the communication network, which may be a server. The terminal 1 can wirelessly access various communication networks for voice switching and/or data exchange.

The communication network may be the Internet or a mobile data network. The mobile data network may include, but not limited to, a Global System for Mobile Communications (GSM) network, a Code Division Multiple Access (CDMA) network, a Wideband Code Division Multiple Access (WCDMA) network, a Long-Term Evolution (LTE) communication network, or the like. Different types of communication networks may be operated by different carriers. The type of communication network does not constitute a limitation of the present disclosure.

Figure 2:
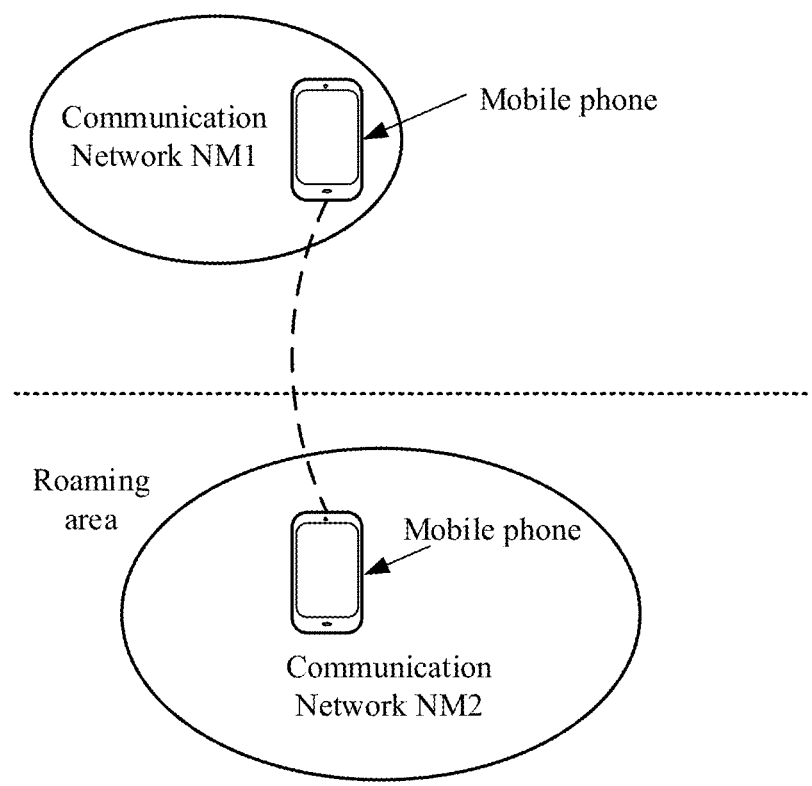
FIG. 2 is an application scenario of a technical solution according to the present disclosure.

FIG. 2 is an application scenario of a technical solution according to the present disclosure. In FIG. 2, a mobile phone is taken as an example to describe the application scenario. For example, the user is located at a local carrier's operating area, but may be transferred from the local carrier's operating area to a roaming area due to work, travel, or the like.

In the local carrier's operating area, the user may have one or more user identity cards, for example, the user has a subscriber identity card, i.e., a subscriber identification module (SIM) card. The SIM card is merely an example, and the user identity card can also be a user identity module (UIM) card. The type of the user identity card may vary depending on the type of the communication network. A mobile phone communicates with a communication network NM1 via the SIM card. The communication network NM1 refers to a communication network corresponding to the user identity card, which can be operated by a corresponding local carrier. For example, the SIM card may belong to a GSM network from China mobile, or belongs to a WCDMA network from China Unicom.

The user may be outside the local carrier's operating area, which means the user is roaming. Taking international roaming as an example, the user may need to use an oversea carrier's communication network NM2 when roaming abroad. International roaming rates are according to agreements between carriers in two countries or regions. In most countries or regions, the international roaming data service charges are much higher than domestic data service charges.

To avoid roaming fees, the user may need to purchase a SIM card from an oversea carrier, which requires the user to visit the oversea carrier's store for relevant business and purchase a phone card belonging to the roaming area. The operation is inconvenient.

Furthermore, a data plan according to conventional technologies, which can provide a way for using data at a lower surcharge while roaming abroad, is achieved through assigning a virtual SIM card from the oversea carrier to the mobile terminal by the server. However, the user may not need to use the virtual SIM card for data services during the entire period abroad. Therefore, it may be a waste of virtual SIM card resources when the user does not use the virtual SIM card, but still occupies it.

Figure 3:
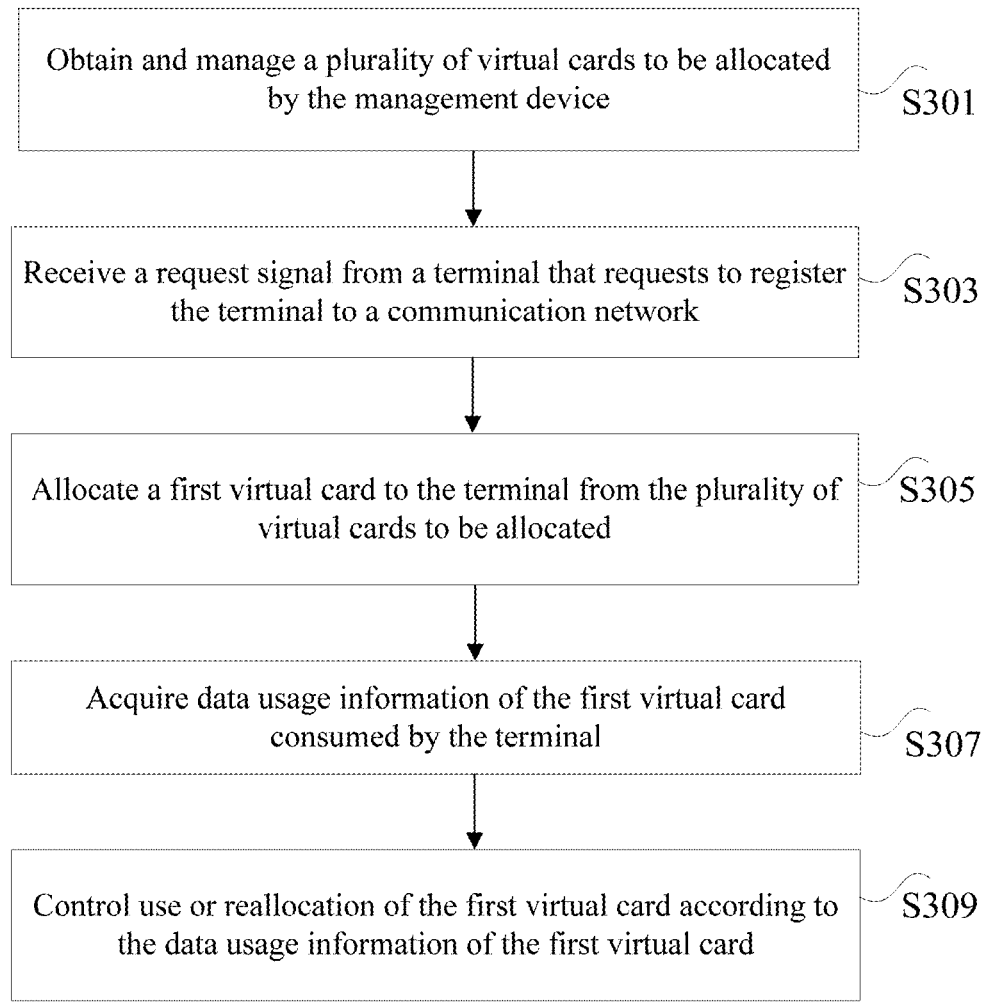
FIG. 3 is a flow chart of a method for controlling data communication according to an embodiment.

According to embodiments of the present disclosure, an example of method for controlling data communication is provided, which can be used in the communication architecture shown in FIG. 1 and in the application scenario shown in FIG. 2. In the above-mentioned operating environment, the present disclosure provides a flow chart of the method for controlling data communication as shown in FIG. 3. The method for controlling data communication is applied to the management device 2. The steps shown in the flow chart of FIG. 3 may be performed as a set of computer-executable instructions executed in a computer system. Although a logical order is shown in the flow chart, however, in some cases, the steps may be performed in an order different from that shown or described herein. As shown in FIG. 3, at S301, a plurality of virtual cards to be allocated by the management device are obtained and managed.

At S303, a request signal from a terminal that requests to register the terminal to a communication network is received.

At S305, a first virtual card is allocated to the terminal from the plurality of virtual cards to be allocated. The terminal can use the first virtual card for data communication.

At S307, data usage information of the first virtual card consumed by the terminal is acquired.

At S309, a use or reallocation of the first virtual card is controlled according to the data usage information of the first virtual card.

In the above-described method, at S301, the management device obtains the plurality of virtual cards to be allocated and manages the plurality of virtual cards to be allocated. After the terminal requests to register to the communication network at S303, the management device allocates the first virtual card to the terminal from the plurality of virtual cards to be allocated at S305. As such, the terminal can use the first virtual card for data communication. At S307, after the terminal starts to use the first virtual card for data communication, the management device acquires the data usage information of the first virtual card consumed by the terminal. At S309, the management device controls the use or reallocation of the first virtual card according to the data usage information of the first virtual card. According to the present disclosure, the use or reallocation of the first virtual card can be controlled according to the data usage information of the first virtual card. It is possible to most efficiently use the resources of the first virtual card and to use the data at a lower charge while satisfying the user's need.

In some embodiments, at S301, the management device obtains and manages the plurality of virtual cards to be allocated. Managing the plurality of virtual cards to be allocated may include allocating and retrieving the virtual cards. The virtual card may be a virtual user identity card for a communication network in a roaming area provided by a company that specially sells the user identify card of the roaming area, or by a local carrier corresponding to the user identity card. The resources of the virtual card can be the data resources of the virtual card.

After receiving the request from the terminal to register to the communication network at S303, the management device allocates the first virtual card to the terminal from the plurality of virtual cards to be allocated at S305, such that the terminal can use the first virtual card for data communication. After the terminal receives the first virtual card, the first virtual card can simulate a complete function of a user identify card, allowing the terminal to register and connect to the communication network provided by an oversea carrier in the roaming area as a local user. The terminal can use the data at local data rates for data communication.

The management device generally does not know data usage information of each virtual card. In some embodiments, the management device can acquire the data usage information of the first virtual card consumed by the terminal (S307) as described below.

The data usage information of the first virtual card consumed by the terminal may be the data usage information of the terminal using the first virtual card for data communication. The data usage information may be an amount of data consumed by the terminal through using the first virtual card for data communication, which can be counted by the terminal.

In some embodiments, the management device can send an acquisition request to the terminal periodically. The acquisition request requires acquiring the data usage information of the terminal that uses the first virtual card for data communication. In response to the acquisition request, the terminal read the amount of data used by the terminal through using the first virtual card. In some other embodiments, the amount of data used by the terminal through using the first virtual card may be reported to the management device by the terminal at regular intervals or when the data usage exceeds certain amount, which can effectively reduce the burden of the management device, and enable the management device to manage the data usage of the virtual SIM cards in real-time.

After acquiring the data usage information of the terminal that uses the first virtual card for data communication, the management device calculates an amount of remaining data for the first virtual card, according to a total amount of data of the first virtual card and the data usage information of the first virtual card consumed by the terminal. At S309, the management device may control the use or reallocation of the first virtual card according to the amount of remaining data.

In some embodiments, controlling the use of the first virtual card can include controlling the terminal to continue using or to stop using the first virtual card for data communication. Controlling the reallocation of the first virtual card can include reallocating the first virtual card to another terminal for data communication, or not allocating the first virtual card anymore.

According to embodiments of the present disclosure, the use or reallocation of the first virtual card can be dynamically controlled based on the data usage information of the terminal associated with the first virtual card, e.g., the amount of data consumed by the terminal through the first virtual card. As such, the resources of the first virtual card can be used to the utmost extent without passing an upper limit of the subscribed data resources. It is possible to use the data at a lower charge while satisfying the user's need. The user's experience is greatly enhanced.

In some embodiments, controlling the use or reallocation of the first virtual card according to the data usage information of the first virtual card (S309) includes disabling the allocation relationship between the first virtual card and the terminal, and retrieving the first virtual card.

The user may not need to occupy the virtual SIM card for data services during the entire period abroad. Therefore, it may be a waste of virtual SIM card resources when the user does not use the virtual SIM card, but still occupies it. Therefore, the allocation relationship between the first virtual card and the terminal can be disabled, and the first virtual card can be retrieved, when the user does not use the virtual SIM card.

In some other embodiments, the allocation relationship between the first virtual card and the terminal can be disabled, and the first virtual card can be retrieved, when the resource of the first virtual card is nearly used up or has been used up.

In some embodiments, disabling the allocation relationship between the first virtual card and the terminal, and retrieving the first virtual card (S309) includes obtaining an amount of remaining data of the first virtual card based on the data usage information of the first virtual card, determining whether the amount of remaining data of the first virtual card is below a first threshold, and, in response to determining that the amount of remaining data of the first virtual card is below the first threshold, disabling the allocation relationship between the first virtual card and the terminal, and retrieving the first virtual card.

The first threshold may be a threshold for stopping the use of the first virtual card, which can be manually set. When the amount of remaining data of the first virtual card is below the first threshold, the management device can disable the allocation relationship between the first virtual card and the terminal, and retrieve the first virtual card.

In some embodiments, disabling the allocation relationship between the first virtual card and the terminal, and retrieving the first virtual card (S309) includes determining whether the amount of remaining data of the first virtual card is below a second threshold, and, in response to determining that the amount of remaining data of the first virtual card is below the second threshold, controlling the terminal to continually use the first virtual card for data communication and retrieving the first virtual card when the terminal releases the first virtual card.

The second threshold may be a threshold for prohibiting the allocation of the first virtual card, which can be manually set. The second threshold is higher than the first threshold. When the data resource of the first virtual card is close to being used up, the amount of remaining data of the first virtual card is first below the second threshold, i.e., the threshold for prohibiting the allocation of the first virtual card. The user is allowed to continue the use of the first virtual card until the amount of remaining data of the first virtual card is below the first threshold, i.e., the threshold for disabling the use of the first virtual card. However, if user releases the first virtual card, the first virtual card can be retrieved and will not be reallocated.

In some embodiments, after disabling the allocation relationship between the first virtual card and the terminal, and retrieving the first virtual card (S309), the method further includes allocating a second virtual card to the terminal from the plurality of virtual cards to be allocated, such that the terminal can use the second virtual card for data communication. An amount of remaining data of the second virtual card is higher than the second threshold, and the second threshold is higher than the first threshold.

That is, after disabling the allocation relationship between the first virtual card and the terminal, and retrieving the first virtual card, the management device may allocate the second virtual card to the terminal, of which the amount of remaining data is higher than the second threshold, i.e., the threshold for prohibiting the allocation of the virtual card. As such, the terminal can use the second virtual card for data communication.

In some embodiments, allocating the first virtual card to the terminal from the plurality of virtual cards to be allocated (S305) includes determining whether the amount of remaining data of the first virtual card is higher than the second threshold and, in response to determining that the amount of remaining data of the first virtual card is higher than the second threshold, allocating the first virtual card to the terminal.

When the user initiates a roaming service, the management device can assign a virtual card having an amount of remaining data higher than the threshold for prohibiting the allocation of the virtual card to the terminal, such that the terminal can use the virtual card having an amount of remaining data higher than the threshold for prohibiting the allocation of the virtual card for data communication.

Furthermore, in some embodiments, receiving the request to register the terminal to the communication network (S303) includes receiving a request signal from the terminal, identifying a type of the communication network to which the terminal is accessed according to the request signal. Further, allocating the first virtual card to the terminal from the plurality of virtual cards to be allocated (S305) includes allocating the first virtual card belonging to the type of the communication network to which the terminal is accessed from the plurality of virtual cards to be allocated.

When roaming, the user can start a customized roaming App on a phone. The phone can perform a network search and, after locating a communication network, request to be registered to the communication network. After receiving a request signal from the phone, the management device can identify a type of the communication network to which the phone is accessed according to the request signal, and allocate to the phone a first virtual card belonging to the type of the communication network to which the phone is accessed from the plurality of virtual cards to be allocated. Types of communication networks are described above.

In some embodiments, calculating the amount of remaining data of the first virtual card according to the data usage information of the first virtual card consumed by the terminal includes determining an amount of accumulated data usage of the first virtual card according to the data usage information of the first virtual card consumed by the terminal, calculating the amount of remaining data of the first virtual card according to the total amount of data of the first virtual card and the amount of accumulated data usage of the first virtual card. The amount of accumulated data usage may be calculated by accumulating the amounts of data used by the terminal during different time periods or the amounts of data used by different terminals. Thus, the management device can calculate the amount of accumulated data usage of the first virtual card and the amount of remaining data of the first virtual card, according to the data usage information of the first virtual card consumed by the terminal.

The data usage information of the first virtual card may be the data usage information of the terminal using the first virtual card for data communication. The data usage information may be an amount of data consumed by the terminal through using the first virtual card for data communication, which can be counted by the terminal. That is to say, the management device can determine the amount of accumulated data usage of the first virtual card according to the amount of data consumed by the terminal through using the first virtual card for data communication, which can be counted by the terminal, and determine the amount of remaining data of the first virtual card according to the total amount of data of the first virtual card and the amount of accumulated data usage of the first virtual card.

According to the present disclosure, the use or reallocation of the first virtual card can be dynamically controlled based on the amount of remaining data of the first virtual card. It is possible to use the resources of the first virtual card to the utmost extent, and use the data at a lower charge while satisfying the user's need.

Figure 4:
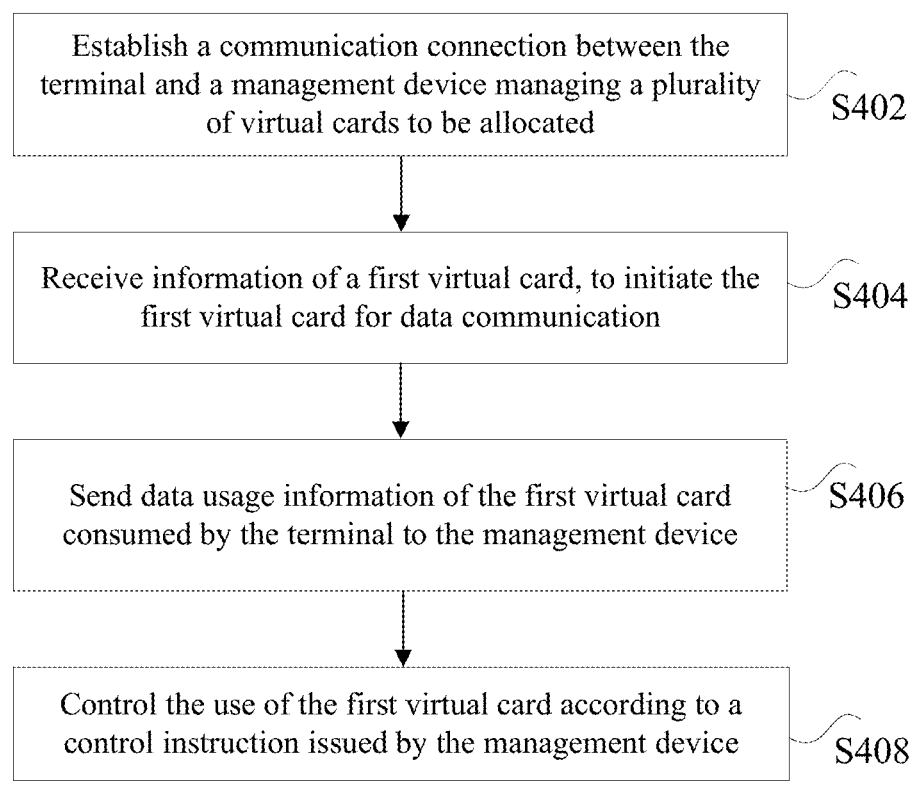
FIG. 4 is a flow chart of a method for controlling data communication according to another embodiment.

According to embodiments of the present disclosure, another example of method for controlling data communication is provided, which can be used in the communication architecture shown in FIG. 1 and in the application scenario shown in FIG. 2. The method for controlling data communication can be implemented in the terminal 1. As shown in FIG. 4, at S402, a communication connection between the terminal and a management device managing a plurality of virtual cards to be allocated is established.

At S404, information of a first virtual card is received, to initiate the first virtual card for data communication.

At S406, data usage information of the first virtual card consumed by the terminal is sent to the management device.

At S408, the use of the first virtual card is controlled according to a control instruction issued by the management device.

In the embodiment of the present disclosure, at S402, the terminal establishes the communication connection with the management device that manages the plurality of virtual cards to be allocated. After establishing the communication connection, at S404, the terminal receives the information of the first virtual card, and initiates the first virtual card for data communication. When using the first virtual card for data communication, at S406, the terminal sends the data usage information of the first virtual card consumed by the terminal to the management device. The management device issues the control instruction to the terminal according to the data usage information of the first virtual card. At S408, the terminal controls the use of the first virtual card according to the control instruction issued by the management device. According to the present disclosure, based on the data usage information of the first virtual card consumed by the terminal, the terminal can control the use of the first virtual card according to the control instruction issued by the management device. It is possible to use the data at a lower charge while satisfying the user's need. The user's experience is greatly enhanced.

The management device can obtain and manage the plurality of virtual cards to be allocated. The management of the plurality of virtual cards to be allocated can include allocating and retrieving the virtual cards. The virtual card may be a virtual user identity card for communication network in roaming area provided by a company that specially sells the user identify card of the roaming area, or by a local carrier corresponding to the user identity card. The resources of the virtual card can be the data resources of the virtual card.

At S402, the terminal establishes the communication connection with the management device that manages the plurality of virtual cards to be allocated. After establishing the communication connection, at S404, the terminal receives the information of the first virtual card, and initiates the first virtual card for data communication. After the terminal is issued the first virtual card, the first virtual card can simulate the complete function of a user identify card. As such, the terminal can be registered to the communication network provided by the oversea carrier as a local user in the roaming area. The terminal can use the data at local data rates for data communication.

The management device generally does not know data usage information of each virtual card. At S406, the terminal sends the data usage information of the first virtual card consumed by the terminal to the management device. The data usage information of the first virtual card consumed by the terminal may be the data usage information of the terminal using the first virtual card for data communication. The data usage information may be an amount of data consumed by the terminal through using the first virtual card for data communication, which can be counted by the terminal.

In some embodiments, the amount of data used by the terminal through using the first virtual card may be reported to the management device by the terminal at regular intervals or when the data usage exceeds certain amount, which can effectively reduce the burden of the management device, and enable the management device to manage the data usage of the virtual SIM cards in real-time.

After the terminal sends the data usage information of the first virtual card to the management device, the management device calculates an amount of remaining data of the first virtual card, according to a total amount of data of the first virtual card and the data usage information of the first virtual card consumed by the terminal. After obtaining the amount of remaining data of the first virtual card, the management device may control the use or reallocation of the first virtual card according to the amount of remaining data of the first virtual card, and send the control instruction for the use or reallocation of the first virtual card to the terminal.

In some embodiments, controlling the use of the first virtual card can include controlling the terminal to continue using or to stop using the first virtual card for data communication. Controlling the reallocation of the first virtual card can include reallocating the first virtual card to another terminal for data communication, or not allocating the first virtual card anymore.

At S408, the terminal controls the use of the first virtual card according to the control instruction issued by the management device. According to embodiments of the present disclosure, the use or reallocation of the first virtual card can be dynamically controlled based on the data usage information of the terminal associated with the first virtual card, e.g., the amount of data consumed by the terminal through the first virtual card. As such, the resources of the first virtual card can be used to the utmost extent without passing an upper limit of the subscribed data resources. It is possible to use the data at a lower charge while satisfying the user's need. The user's experience is greatly enhanced.

In some embodiments, sending the data usage information of the first virtual card consumed by the terminal to the management device (S406) includes the terminal reporting the data usage information of the first virtual card consumed by the terminal in accordance with a preset rule.

The preset rule may be that the amount of data consumed by the terminal through using the first virtual card may be reported to the management device by the terminal at regular intervals or when the data usage is exceeds a certain amount. The data usage information of the first virtual card consumed by the terminal may be the data usage information of the terminal using the first virtual card for data communication. The data usage information may be an amount of data consumed by the terminal through using the first virtual card for data communication, which can be counted by the terminal.

In some embodiments, controlling the use of the first virtual card according to the control instruction issued by the management device (S408) includes disabling the first virtual card and initiating a second virtual card, where the amount of remaining data of the second virtual card is larger than the amount of remaining data of the first virtual card.

The first threshold may be a threshold for disabling the use of the first virtual card, which can be manually set. When the amount of remaining data of the first virtual card is below the first threshold, the management device disables the allocation relationship between the first virtual card and the terminal, and retrieves the first virtual card. According to the control instruction issued by the management device, the terminal disables the first virtual card and initiates the second virtual card, where the amount of remaining data of the second virtual card is higher than the amount of remaining data of the first virtual card.

The second threshold may be a threshold for prohibiting the allocation of the first virtual card, which can be manually set. The management device may only assign a virtual card having an amount of remaining data above the second threshold to the terminal, such that the terminal can use the virtual card having the amount of remaining data above the second threshold for data communication.

According to the present disclosure, the use or reallocation of the first virtual card can be dynamically controlled based on the amount of remaining data of the first virtual card. The terminal uses the first virtual card according to the control instruction issued by the management device. It is possible to use the data at a lower charge while satisfying the user's need. The user's experience is greatly enhanced.

Figure 5:
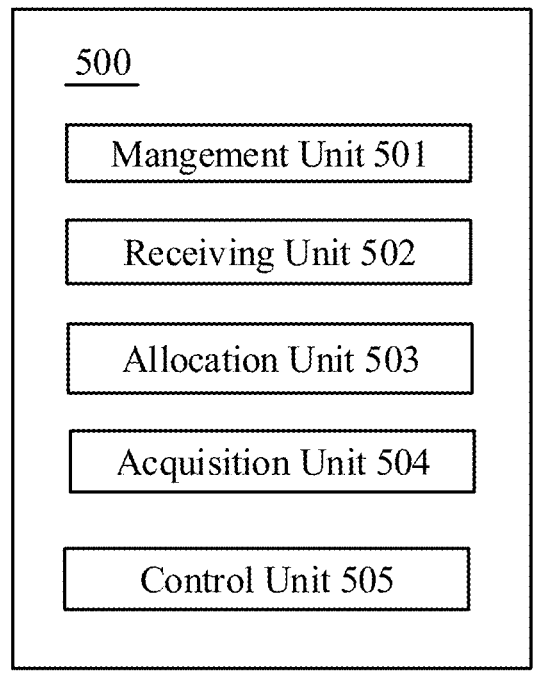
FIG. 5 is a schematic diagram of an apparatus for controlling data communication according to an embodiment.

According to embodiments of the present disclosure, an example of apparatus 500 for controlling data communication is provided, which can be used in the communication architecture shown in FIG. 1 and in the application scenario shown in FIG. 2. The apparatus 500 is included in the management device 2. As shown in FIG. 5, the apparatus 500 includes a management unit 501, a receiving unit 502, an allocation unit 503, an acquisition unit 504, and a control unit 505.

The management unit 501 is configured to enable the management device to obtain and manage a plurality of virtual cards to be allocated.

The receiving unit 502 is configured to receive a request signal from a terminal that requests to register the terminal to a communication network.

The allocation unit 503 is configured to allocate a first virtual card to the terminal from the plurality of virtual cards to be allocated, such that the terminal can use the first virtual card for data communication.

The acquisition unit 504 is configured to acquire data usage information of the first virtual card consumed by the terminal.

The control unit 505 is configured to control a use or reallocation of the first virtual card according to the data usage information of the first virtual card.

In the above-described embodiment, the management unit 501 can enable the management device to obtain the plurality of virtual cards to be allocated and to manage the plurality of virtual cards to be allocated. After the receiving unit 502 receives the request to register the terminal to the communication network, the allocation unit 503 can allocate the first virtual card to the terminal from the plurality of virtual cards to be allocated, such that the terminal can use the first virtual card for data communication. After the terminal starts to use the first virtual card for data communication, the acquisition unit 504 can acquire the data usage information of the first virtual card consumed by the terminal. The control unit 505 can control the use or reallocation of the first virtual card according to the data usage information of the first virtual card. According to the present disclosure, the use or reallocation of the first virtual card can be controlled according to the data usage information of the first virtual card. It is possible to use the resources of the first virtual card to the utmost extent and to use the data at a lower charge while satisfying the user's need.

The management device can obtain and manage the plurality of virtual cards to be allocated, where the management of the plurality of virtual cards to be allocated includes allocating and/or retrieving the virtual cards. The virtual card may be a virtual user identity card for the communication network in the roaming area provided by a company that sells the user identify card of the roaming area, or by a local carrier corresponding to the user identity card. The resources of the virtual card can be the data resources of the virtual card.

After the receiving unit 502 receives the request to register the terminal to the communication network, the allocation unit 503 allocates the first virtual card to the terminal from the plurality of virtual cards to be allocated, such that the terminal can use the first virtual card for data communication. After the terminal starts to use the first virtual card, the first virtual card can simulate a complete function of a user identify card, allowing the terminal to register and connect to the communication network provided by an oversea carrier in the roaming area as a local user. The terminal can use the data at local data rates for data communication.

The management device generally does not know data usage information of each virtual card. In the present disclosure, the acquisition unit 504 can acquire data usage information of the first virtual card consumed by the terminal as described below.

The data usage information of the first virtual card consumed by the terminal may be the data usage information of the terminal using the first virtual card for data communication. The data usage information may be an amount of data consumed by the terminal through using the first virtual card for data communication, which can be counted by the terminal.

In some embodiments, the acquisition unit 504 can send an acquisition request to the terminal periodically. The acquisition request requires acquiring the data usage information of the terminal that uses the first virtual card for data communication. In response to the acquisition request, the terminal read the amount of data used by the terminal through using the first virtual card. In some other embodiments, the amount of data used by the terminal through using the first virtual card may be reported to the management device by the terminal at regular intervals or when the data usage exceeds certain amount, which can effectively reduce the burden of the management device, and enable the management device to manage the data usage of the virtual SIM cards in real-time After acquiring the data usage information of the terminal that uses the first virtual card for data communication, the acquisition unit 504 calculates an amount of remaining data of the first virtual card, according to a total amount of data of the first virtual card and the data usage information of the first virtual card consumed by the terminal. The control unit 505 may control the use or reallocation of the first virtual card according to the amount of remaining data of the first virtual card.

In some embodiments, controlling the use of the first virtual card can include controlling the terminal to continue using or to stop using the first virtual card for data communication. Controlling the reallocation of the first virtual card can include reallocating the first virtual card to another terminal for data communication, or not allocating the first virtual card anymore.

According to embodiments of the present disclosure, the use or reallocation of the first virtual card can be dynamically controlled based on the data usage information of the terminal associated with the first virtual card, e.g., the amount of data consumed by the terminal through the first virtual card. As such, the resources of the first virtual card can be used to the utmost extent without passing an upper limit of the subscribed data resources. It is possible to use the data at a lower charge while satisfying the user's need. The user's experience is greatly enhanced.

In some embodiments, the controlling by the control unit 505 of the use or reallocation of the first virtual card according to the data usage information of the first virtual card includes disabling the allocation relationship between the first virtual card and the terminal, and retrieving the first virtual card.

The user may not need to occupy the virtual SIM card for data services during the entire period abroad. Therefore, it may be a waste of virtual SIM card resources when the user does not use the virtual SIM card, but still occupies it. Therefore, the allocation relationship between the first virtual card and the terminal can be disabled, and the first virtual card can be retrieved, when the user does not use the virtual SIM card.

In some embodiments, the allocation relationship between the first virtual card and the terminal can be disabled, and the first virtual card can be retrieved, when the resource of the first virtual card is nearly used up or has been used up.

In some embodiments, disabling the allocation relationship between the first virtual card and the terminal, and retrieving the first virtual card includes obtaining an amount of remaining data of the first virtual card based on the data usage information of the first virtual card, determining whether the amount of remaining data of the first virtual card is below a first threshold, and, in response to determining that the amount of remaining data of the first virtual card is below the first threshold, disabling the allocation relationship between the first virtual card and the terminal, and retrieving the first virtual card.

The first threshold may be a threshold for stopping the use of the first virtual card, which can be manually set. When the amount of remaining data of the first virtual card is below the first threshold, the management device can disable the allocation relationship between the first virtual card and the terminal, and retrieve the first virtual card.

In some embodiments, disabling the allocation relationship between the first virtual card and the terminal, and retrieving the first virtual card includes determining whether the amount of remaining data of the first virtual card is below a second threshold, and, in response to determining that the amount of remaining data of the first virtual card is below the second threshold, controlling the terminal to continually use the first virtual card for data communication and retrieving the first virtual card when the terminal releases the first virtual card.

The second threshold may be a threshold for prohibiting the allocation of the first virtual card, which can be manually set. The second threshold is higher than the first threshold. When the data resource of the first virtual card is close to being used up, the amount of remaining data of the first virtual card is first below the second threshold, i.e., the threshold for prohibiting the allocation of the first virtual card. The user is allowed to continue the use of the first virtual card until the amount of remaining data of the first virtual card is below the first threshold, i.e., the threshold for disabling the use of the first virtual card. However, if user releases the first virtual card, the first virtual card can be retrieved and will not be reallocated.

In some embodiments, after the control unit 505 disables the allocation relationship between the first virtual card and the terminal, and retrieves the first virtual card, the allocation unit 503 allocates a second virtual card to the terminal from the plurality of virtual cards to be allocated, such that the terminal can use the second virtual card for data communication. An amount of remaining data of the second virtual card is higher than the second threshold, and the second threshold is higher than the first threshold.

That is, after disabling the allocation relationship between the first virtual card and the terminal, and retrieving the first virtual card, the management device may allocate the second virtual card to the terminal, of which the amount of remaining data is higher than the second threshold, i.e., the threshold for prohibiting the allocation of the virtual card. As such, the terminal can use the second virtual card for data communication.

In some embodiments, the allocation by the allocation unit 503 of the first virtual card to the terminal from the plurality of virtual cards to be allocated includes determining whether the amount of remaining data of the first virtual card is higher than the second threshold and, in response to determining that the amount of remaining data of the first virtual card is higher than the second threshold, allocating the first virtual card to the terminal.

When the user initiates a roaming service, the management device can assign a virtual card having an amount of remaining data higher than the threshold for prohibiting the allocation of the virtual card, to the terminal, such that the terminal can use the virtual card having an amount of remaining data higher than the threshold for prohibiting the allocation of the virtual card, for data communication.

Furthermore, in some embodiments, the receiving by the receiving unit 502 of the request to register the terminal to the communication network includes receiving a request signal from the terminal, identifying a type of the communication network to which the terminal is accessed according to the request signal. The allocation unit 503 allocates the first virtual card belonging to the type of the communication network to which the terminal is accessed from the plurality of virtual cards to be allocated.

When roaming, the user can start a customized roaming App on a phone. The phone can perform a network search and, after locating a communication network, request to be registered to the communication network. After receiving a request signal from the phone, the management device can identify a type of the communication network to which the phone is accessed according to the request signal, and allocate to the phone a first virtual card belonging to the type of the communication network to which the phone is accessed from the plurality of virtual cards to be allocated. Types of communication networks are described above.

In some embodiments, the calculating by the acquisition unit 504 of the amount of remaining data of the first virtual card according to the data usage information of the first virtual card consumed by the terminal includes determining an amount of accumulated data usage of the first virtual card according to the data usage information of the first virtual card consumed by the terminal, calculating the amount of remaining data of the first virtual card according to the total amount of data of the first virtual card and the amount of accumulated data usage of the first virtual card. The amount of accumulated data usage may be calculated by accumulating the amounts of data used by the terminal during different time periods or the amounts of data used by different terminals. Thus, the management device can calculate the amount of accumulated data usage of the first virtual card and the amount of remaining data of the first virtual card, according to the data usage information of the first virtual card consumed by the terminal.

The data usage information of the first virtual card may be the data usage information of the terminal using the first virtual card for data communication. The data usage information may be an amount of data consumed by the terminal through using the first virtual card for data communication, which can be counted by the terminal. That is to say, the management device can determine the amount of accumulated data usage of the first virtual card according to the amount of data consumed by the terminal through using the first virtual card for data communication, which can be counted by the terminal, and determine the amount of remaining data of the first virtual card according to the total amount of data of the first virtual card and the amount of accumulated data usage of the first virtual card.

According to the present disclosure, the use or reallocation of the first virtual card can be dynamically controlled based on the amount of remaining data of the first virtual card. It is possible to use the resources of the first virtual card to the utmost extent, and use the data at a lower charge while satisfying the user's need.

Figure 6:
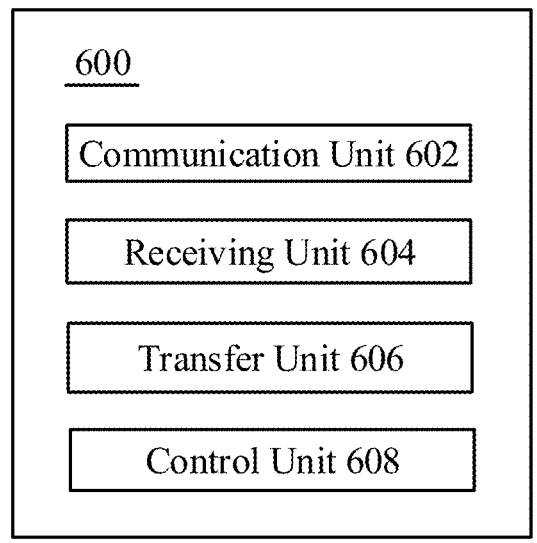
FIG. 6 is a schematic diagram of an apparatus for controlling data communication according to another embodiment.

According to embodiments of the present disclosure, another example of apparatus 600 for controlling data communication is provided, which can be used in the communication architecture shown in FIG. 1 and in the application scenario shown in FIG. 2. The apparatus 600 is included in the terminal 1. As shown in FIG. 6, the apparatus 600 includes a communication unit 602, a receiving unit 604, a transfer unit 606, and a control unit 608.

The communication unit 602 is configured to establish a communication connection between the terminal and a management device managing a plurality of virtual cards to be allocated.

The receiving unit 604 is configured to receive information of a first virtual card, and initiate the first virtual card for data communication.

The transfer unit 606 is configured to send data usage information of the first virtual card consumed by the terminal to the management device.

The control unit 608 is configured to control a use of the first virtual card according to a control instruction issued by the management device.

In the embodiment of the present disclosure, the terminal establishes the communication connection with the management device that manages the plurality of virtual cards to be allocated through the communication unit 602. After establishing the communication connection, the receiving unit 604 receives the information of the first virtual card from the management device, and initiates the first virtual card for data communication. When using the first virtual card for data communication, the transfer unit 606 sends the data usage information of the first virtual card consumed by the terminal to the management device. The management device issues the control instruction to the terminal according to the data usage information of the first virtual card. The control unit 608 controls the use of the first virtual card according to the control instruction issued by the management device. According to the present disclosure, based on the data usage information of the first virtual card consumed by the terminal, the terminal can control the use of the first virtual card according to the control instruction issued by the management device. It is possible to use the data at a lower charge while satisfying the user's need. The user's experience is greatly enhanced.

The management device can obtain and manage the plurality of virtual cards to be allocated, where the management of the plurality of virtual cards to be allocated includes allocating and retrieving the virtual cards. The virtual card may be a virtual user identity card for communication network in roaming area provided by a company that specially sells the user identify card of the roaming area, or by a local carrier corresponding to the user identity card. The resources of the virtual card can be the data resources of the virtual card.

The terminal establishes the communication connection with the management device that manages the plurality of virtual cards to be allocated through the communication unit 602. After establishing the communication connection, the receiving unit 604 receives the information of the first virtual card, and initiates the first virtual card for data communication. After the terminal is issued the first virtual card, the first virtual card can simulate the complete function of a user identify card. As such, the terminal can be registered to the communication network provided by the oversea carrier as a local user in the roaming area. The terminal can use the data at local data rates for data communication.

The management device generally does not know data usage information of each virtual card. The transfer unit 606 sends the data usage information of the first virtual card consumed by the terminal to the management device. The data usage information of the first virtual card consumed by the terminal may be the data usage information of the terminal using the first virtual card for data communication. The data usage information may be an amount of data consumed by the terminal through using the first virtual card for data communication, which can be counted by the terminal.

In some embodiments, the amount of data used by the terminal through the first virtual card may be reported to the management device by the terminal at regular intervals or when the data usage exceeds certain amount, which can effectively reduce the burden of the management device, and enable the management device to manage the data usage of the virtual SIM cards in real-time.

After the transfer unit 606 sends the data usage information of the first virtual card to the management device, the management device calculates an amount of remaining data of the first virtual card, according to a total amount of data of the first virtual card and the data usage information of the first virtual card consumed by the terminal. After obtaining the amount of remaining data of the first virtual card, the management device may control the use or reallocation of the first virtual card according to the amount of remaining data of the first virtual card, and sends the control instruction for the use or reallocation of the first virtual card to the terminal.

In some embodiments, controlling the use of the first virtual card can include controlling the terminal to continue using or to stop using the first virtual card for data communication. Controlling the reallocation of the first virtual card can include reallocating the first virtual card to another terminal for data communication, or not allocating the first virtual card anymore.

Further, the control unit 608 controls the use of the first virtual card according to the control instruction issued by the management device. According to embodiments of the present disclosure, the use or reallocation of the first virtual card can be dynamically controlled based on the data usage information of the first virtual card consumed by the terminal. As such, the resources of the first virtual card can be used to the utmost extent without passing an upper limit of the subscribed data resources. It is possible to use the data at a lower charge while satisfying the user's need. The user's experience is greatly enhanced.

In some other embodiments, the transfer unit 606 reports the data usage information of the first virtual card consumed by the terminal in accordance with a preset rule.

The preset rule may be that the amount of data used by the terminal through the first virtual card may be reported to the management device by the terminal at regular intervals or when the data usage exceeds a certain amount. The data usage information of the first virtual card consumed by the terminal may be the data usage information of the terminal using the first virtual card for data communication. The data usage information may be an amount of data consumed by the terminal through using the first virtual card for data communication, which can be counted by the terminal.

In some embodiments, the controlling by the control unit 608 of the use of the first virtual card according to the control instruction issued by the management device includes disabling the first virtual card and initiating a second virtual card, where the amount of remaining data of the second virtual card is larger than the amount of remaining data of the first virtual card.

The first threshold may be a threshold for disabling the use of the first virtual card, which can be manually set. When the amount of remaining data of the first virtual card is below the first threshold, the management device disables the allocation relationship between the first virtual card and the terminal, and retrieves the first virtual card. According to the control instruction issued by the management device, the terminal disables the first virtual card; and initiates the second virtual card, where the amount of remaining data of the second virtual card is higher than the amount of remaining data of the first virtual card.

The second threshold may be a threshold for prohibiting the allocation of the first virtual card, which can be manually set. The management device may only assign a virtual card having an amount of remaining data above the second threshold to the terminal, such that the terminal can use the virtual card having the amount of remaining data above the second threshold for data communication.

According to the present disclosure, the use or reallocation of the first virtual card can be dynamically controlled based on the amount of remaining data of the first virtual card. The terminal uses the first virtual card according to the control instruction issued by the management device. It is possible to use the data at a lower charge while satisfying the user's need. The user's experience is greatly enhanced.

Figure 7:
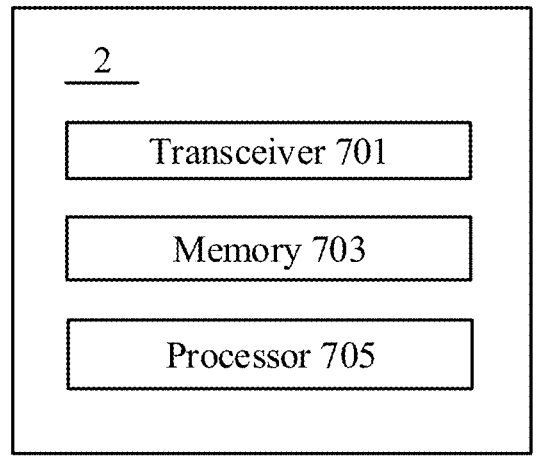
FIG. 7 is a schematic diagram of a management device according to the present disclosure.

According to embodiments of the present disclosure, a management device is provided, which can be used in the communication architecture shown in FIG. 1 and in the application scenario shown in FIG. 2. As shown in FIG. 7, the management device 2 includes a transceiver 701, a memory 703, and a processor 705.

The transceiver 701 is configured to receive and/or send a signal.

The memory 703 is configured to store a computer program.

The processor 705 is configured to execute the computer program, and to generate instructions for performing a method including obtaining and managing a plurality of virtual cards to be allocated, receiving a request signal from a terminal to register the terminal to a communication network through the transceiver 701, allocating a first virtual card to the terminal from the plurality of virtual cards to be allocated such that the terminal can use the first virtual card for data communication, acquiring data usage information of the first virtual card consumed by the terminal through the transceiver 701, and controlling a use or reallocation of the first virtual card by the transceiver 701 according to the data usage information of the first virtual card.

According to embodiments of the present disclosure, the management device can obtain and manage the plurality of virtual cards to be allocated. After the terminal requests to register the terminal to the communication network, the management device allocates the first virtual card to the terminal from the plurality of virtual cards to be allocated such that the terminal can use the first virtual card for data communication. After the terminal starts to use the first virtual card for data communication, the management device acquires data usage information of the first virtual card consumed by the terminal. The management device controls the use or reallocation of the first virtual card according to the data usage information of the first virtual card. According to the present disclosure, the use or reallocation of the first virtual card can be controlled according to the data usage information of the first virtual card. It is possible to use the resources of the first virtual card to the utmost extent and to use the data at a lower charge while satisfying the user's need.

The transceiver 701 may be any wireless transceiver, and detailed description thereof is omitted here.

The memory 703 may include one or more computer programs. The memory 703 can be any type of computer readable storage medium, for example, a volatile memory and/or a nonvolatile memory. The volatile memory may include a Random Access Memory (RAM), and/or a high-speed cache memory, or the like. The nonvolatile memory includes, for example, a Programmable Read-Only Memory (PROM), a hard disk, a Flash memory, or the like. One or more program instructions may be stored the computer readable storage medium. The processor 705 performs the program instructions to implement a method for controlling data communication, such as one of the methods described above in connection with FIG. 3. A variety of applications and various data may also be stored in a computer-readable storage medium, for example, working status of a display screen, operating status of an application, or the like.

The processor 705 may include one or more processors. The processor may be a Central Processing Unit (CPU) or another form of processing unit with data processing capabilities and/or instruction execution capabilities, including, but not limited to, Microcontroller (MCU), or Field Programmable Gate Array (FPGA), or the like. The professor 705 may control other components in the management device 2 to perform a desired function, according to the computer programs stored in the memory 703.

The components and configurations of the management device 2 shown in FIG. 7 are merely examples and not limited, and the management device 2 may also have other components and configurations as needed, and may include, for example, an acquisition unit, a display unit, or the like.

The processor 705 executes the computer program stored in the memory 703 and generates instructions for performing a method including, for example, enabling the management device to obtain and manage the plurality of virtual cards to be allocated, including allocating and retrieving the virtual cards. The virtual card may be a virtual user identity card for communication network in roaming area provided by a company that specially sells the user identify card of the roaming area, or by a local carrier corresponding to the user identity card. The resources of the virtual card can be the data resources of the virtual card.

After receiving a request to register the terminal to the communication network by using the transceiver 701, the management device can allocate the first virtual card to the terminal from the plurality of virtual cards to be allocated, allowing the terminal to use the first virtual card for data communication. After the terminal starts to use the first virtual card, the first virtual card can simulate a complete function of a user identify card, allowing the terminal to register and connect to the communication network provided by an oversea carrier in the roaming area as a local user.

The management device generally does not know data usage information of each virtual card. According to the present disclosure, the management device uses the transceiver 701 to acquire data usage information of the first virtual card consumed by the terminal, as described below.

The data usage information of the first virtual card consumed by the terminal may be the data usage information of the terminal using the first virtual card for data communication. The data usage information may be an amount of data consumed by the terminal through using the first virtual card for data communication, which can be counted by the terminal.

The data usage information may be acquired through sending an acquisition request to the terminal by the transceiver 701 periodically. The acquisition request requires acquiring the data usage information of the terminal that uses the first virtual card for data communication. In response to the acquisition request, the terminal read the amount of data used by the terminal through using the first virtual card. In some other embodiments, the amount of data used by the terminal through using the first virtual card may be reported to the management device by the terminal at regular intervals or when the data usage exceeds certain amount, which can effectively reduce the burden of the management device, and enable the management device to manage the data usage of the virtual SIM cards in real-time.

After acquiring the data usage information of the terminal that uses the first virtual card for data communication, the processor 705 calculates an amount of remaining data of the first virtual card, according to a total amount of data of the first virtual card and the data usage information of the first virtual card consumed by the terminal. The processor 705 acquires the amount of remaining data of the first virtual card, and the transceiver 701 may control the use or reallocation of the first virtual card according to the amount of remaining data of the first virtual card.

In some embodiments, controlling the use of the first virtual card can include controlling the terminal to continue using or to stop using the first virtual card for data communication. Controlling the reallocation of the first virtual card can include reallocating the first virtual card to another terminal for data communication, or not allocating the first virtual card anymore.

According to embodiments of the present disclosure, the use or reallocation of the first virtual card can be dynamically controlled based on the data usage information of the terminal associated with the first virtual card, e.g., the amount of data consumed by the terminal through the first virtual card. As such, the resources of the first virtual card can be used to the utmost extent without passing an upper limit of the subscribed data resources. It is possible to use the data at a lower charge while satisfying the user's need. The user's experience is greatly enhanced.

Figure 8:
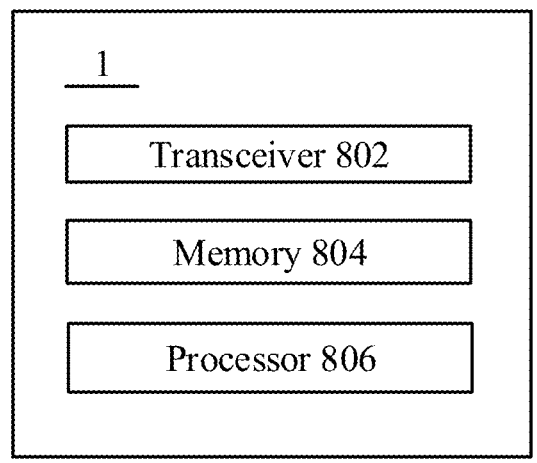
FIG. 8 is a schematic diagram of a mobile terminal according to the present disclosure.

According to embodiments of the present disclosure, an example of terminal is provided, which can be used in the communication architecture shown in FIG. 1 and in the application scenario shown in FIG. 2. As shown in FIG. 8, the terminal 1 includes a transceiver 802, a memory 804, and a processor 806.

The transceiver 802 is configured to receive and/or send a signal.

The memory 804 is configured to store a computer program.

The processor 806 is configured to execute the computer program, and to generate instructions for performing a method including establishing, through the transceiver 802, a communication connection between the terminal and a management device managing a plurality of virtual cards to be allocated, receiving information of a first virtual card from the management device, initiating the first virtual card for data communication, sending data usage information of the first virtual card consumed by the terminal to the management device, and controlling a use of the first virtual card according to a control instruction issued by the management device.

In the embodiment of the present disclosure, the terminal establishes the communication connection with the management device that manages the plurality of virtual cards to be allocated. After establishing the communication connection, the terminal can receive the information of the first virtual card from the management device, and initiate the first virtual card for data communication. When using the first virtual card for data communication, the terminal can send the data usage information of the first virtual card consumed by the terminal to the management device. The management device can issue the control instruction to the terminal according to the data usage information of the first virtual card. The terminal can control the use of the first virtual card according to the control instruction issued by the management device. According to the present disclosure, based on the data usage information of the first virtual card consumed by the terminal, the terminal can control the use of the first virtual card according to the control instruction issued by the management device. It is possible to use the data at a lower charge while satisfying the user's need. The user's experience is greatly enhanced.

The transceiver 802 may be any wireless transceiver, and detailed description thereof is omitted here.

The memory 804 may include one or more computer programs. The memory 804 can be any type of computer readable storage medium, for example a volatile memory and/or a nonvolatile memory. The volatile memory may include a Random Access Memory (RAM), and/or a high-speed cache memory, or the like. The nonvolatile memory includes, for example, a Programmable Read-Only Memory (PROM), a hard disk, a Flash memory, or the like. One or more program instructions may be stored the computer readable storage medium. The processor 806 performs the program instructions to implement a method for controlling data communication, such as one of the methods described above in connection with FIG. 4. A variety of applications and various data may also be stored in a computer-readable storage medium, for example working status of a display screen, operating status of an application, or the like.

The processor 806 may include one or more processors. The processor may be Central Processing Unit (CPU) or another form of processing unit with data processing capabilities and/or instruction execution capabilities, including, but not limited to, Microcontroller (MCU), or Field Programmable Gate Array (FPGA), or the like. The professor 806 may control other components in the terminal 1 to perform a desired function, according to the computer programs stored in the memory 804.

The components and configurations of the terminal 1 shown in FIG. 8 are merely examples and not limited, and the terminal 1 may also have other components and configurations as needed, and may include, for example, an acquisition unit, a display unit, or the like.

The management device can obtain and manage the plurality of virtual cards to be allocated, where managing the plurality of virtual cards to be allocated includes allocating and retrieving the virtual cards. The virtual card may be a virtual user identity card for communication network in roaming area provided by a company that specially sells the user identify card of the roaming area, or by a local carrier corresponding to the user identity card. The resources of the virtual card can be the data resources of the virtual card.

The terminal establishes the communication connection through the transceiver 802 with the management device that manages the plurality of virtual cards to be allocated. After establishing the communication connection, the terminal receives the information of the first virtual card, and initiates the first virtual card for data communication. After the terminal is issued the first virtual card, the first virtual card can simulate a complete function of a user identify card, allowing the terminal to register and connect to the communication network provided by an oversea carrier in the roaming area as a local user. The terminal can use the data at local data rates for data communication.

The management device generally does not know data usage information of each virtual card. In the present disclosure, the terminal reports the data usage information of the first virtual card consumed by the terminal to the management device. The data usage information of the first virtual card consumed by the terminal may be the data usage information of the terminal using the first virtual card for data communication. The data usage information may be an amount of data consumed by the terminal through using the first virtual card for data communication, which can be counted by the terminal.

In some embodiments, the amount of data consumed by the terminal through using the first virtual card can be counted by the terminal and reported to the management device by the terminal at regular intervals or when the data usage exceeds a certain amount. This can effectively reduce the burden of the management device, and enable the management device to manage the data usage of the virtual SIM cards in real-time.

After the terminal sends the amount of data used by the terminal through using the first virtual card for data communication, the management device calculates an amount of remaining data of the first virtual card, according to a total amount of data of the first virtual card and the data usage information of the first virtual card consumed by the terminal. After calculating the amount of remaining data of the first virtual card, the management device may control the use or reallocation of the first virtual card according to the amount of remaining data of the first virtual card, and send a control instruction for the use or reallocation of the first virtual card to the terminal.

In some embodiments, controlling the use of the first virtual card can include controlling the terminal to continue using or to stop using the first virtual card for data communication. Controlling the reallocation of the first virtual card can include reallocating the first virtual card to another terminal for data communication, or not allocating the first virtual card anymore.

Thus, the terminal controls the use of the first virtual card according to the control instruction issued by the management device. According to embodiments of the present disclosure, the use or reallocation of the first virtual card can be dynamically controlled based on the data usage information of the first virtual card consumed by the terminal. As such, the resources of the first virtual card can be used to the utmost extent without passing an upper limit of the subscribed data resources. It is possible to use the data at a lower charge while satisfying the user's need. The user's experience is greatly enhanced.

A method according to the embodiments of the disclosure can be realized by means of software plus a hardware platform, and can also be realized by a hardware platform. Embodiments of the present disclosure can be implemented in the form of a software product stored in a storage medium (such as ROM/RAM, magnetic disc, optical disc), which may include a number of instructions for enabling a terminal device (which may be a mobile phone, a computer, a server, an air conditioner, or a network device, or the like) to perform a method consistent with the disclosure, such as one of the methods described above.

For the sake of simplicity, the above-mentioned embodiments of the method and apparatus are described as a series of steps or combination of units, but a person in the art will recognize that the present disclosure is not limited by the described sequence of steps or the connection of units. In accordance with the present disclosure, certain steps may be performed in other order or at the same time, some units may use other connections.

It should also be understood by the person in the art that the embodiments described in the specification are merely examples. The numbers in the disclosed embodiments are merely for the purpose of description, and the steps and units are not necessary for the present disclosure.

For embodiments of the present disclosure, different embodiments may have different focus. The portions not detailed in one embodiment may be found in the relevant description of other embodiments.

In several disclosed embodiments, it should be understood that the disclosed technical solution may be implemented in other ways. For example, the embodiments of the apparatus described-above are merely for illustration. For example, the division of the units is merely a logical function division, and there may be other ways for implementing. For example, multiple units or components may be combined or may be integrated into another system, or some feature may be ignored, or not executed. In other respects, the mutual coupling, direct coupling, or communication connection shown or discussed herein may be either an indirect coupling or a communication connection via communication interfaces, apparatus, or units, and may be electrical type, or other types.

The units described as separate parts may or may not be physically separated, and the components shown as units may or may not be physical units, i.e., they may be located in one place or may be distributed over a network. Part or all of the units may be selected according to the actual needs to achieve the objective of the embodiment.

In addition, in various disclosed embodiments, the functional units may be integrated into one processing unit, or may physically exist separately, or two or more functional units may be integrated into one processing unit. The functional units can be implemented either in hardware or in the form of software functional units.

If the functions are implemented in the form of software functional units, and sold or used as a separate product, the functions may be stored in a computer-readable storage medium. Based on this understanding, embodiments of the present disclosure can be implemented in the form of a software product. The software product stored in a storage medium includes a number of instructions for enabling a computer device (which may be a mobile phone, a computer, a server, or a network device, etc.) to perform all or part of a method consistent with the disclosure, such as one of the methods described above. The aforementioned storage medium includes one or more of various mediums that can store instructions, such as a USB disk, a mobile hard disk, a Read-Only Memory (ROM), a Random Access Memory, a magnetic disk, or an optical disk, or the like.

The embodiments disclosed herein are merely examples. Other applications, advantages, alternations, modifications, or equivalents to the disclosed embodiments are obvious to a person skilled in the art and are intended to be encompassed within the scope of the present disclosure.

What is claimed is:

1. A method for controlling data communication comprising:

receiving a request to register a terminal to a communication network;

allocating a virtual card to the terminal for data communication;

acquiring data usage information of the virtual card, the data usage information including an amount of data consumed by the terminal through using the virtual card; and dynamically controlling use or reallocation of the virtual card currently used by the terminal for data communication according to the data usage information, including:

in response to determining, according to the data usage information, that the amount of data consumed by the terminal through using the virtual card within a certain period of time is zero:

stopping the terminal from using the virtual card; and retrieving the virtual card;

acquiring an amount of remaining data of the virtual card according to the data usage information; and in response to the amount of remaining data of the virtual card being below an allocation-prohibition threshold and higher than a stop-use threshold:

controlling the terminal to continually use the virtual card for data communication until the terminal releases the virtual card at a time before the amount of remaining data of the virtual card reaches the stop-use threshold; and retrieving the virtual card in response to the terminal releasing the virtual card and prohibiting the retrieved virtual card from being reallocated.

2. The method according to claim 1, wherein controlling the use or reallocation of the virtual card further includes:

in response to the amount of remaining data of the virtual card being below the stop-use threshold:

stopping the terminal from using the virtual card, and retrieving the virtual card.

3. The method according to claim 1, wherein acquiring the amount of remaining data of the virtual card includes:
determining an amount of accumulated data usage of the virtual card according to the data usage information; and
calculating the amount of remaining data of the virtual card according to a total amount of data of the virtual card and the amount of accumulated data usage of the virtual card.

4. The method for controlling data communication according to claim 2,
wherein the virtual card is a first virtual card,
the method further comprising:
allocating a second virtual card to the terminal for data communication,
wherein an amount of remaining data of the second virtual card is higher than the allocation-prohibition threshold.

5. The method according to claim 1, wherein allocating the virtual card to the terminal includes:
allocating a virtual card having an amount of remaining data higher than the allocation-prohibition threshold to the terminal.

6. The method according to claim 1, wherein receiving the request includes:
receiving the request from the terminal; and
identifying a type of the communication network to which the terminal is accessed according to the request.

7. The method according to claim 6, wherein allocating the virtual card to the terminal includes:
allocating a virtual card belonging to the type of the communication network to the terminal.

8. The method according to claim 1, further comprising:
obtaining and managing a plurality of virtual cards to be allocated.

9. The method according to claim 8, wherein allocating the virtual card to the terminal includes allocating one of the plurality of virtual cards to the terminal.

10. The method according to claim 1, wherein:
allocating the virtual card to the terminal includes allocating a virtual card having an amount of remaining data higher than the allocation-prohibition threshold to the terminal; and
controlling the use or reallocation of the virtual card further includes:
in response to the amount of remaining data of the virtual card being below the allocation-prohibition threshold and higher than the stop-use threshold and the terminal releasing the virtual card, retrieving the virtual card and prohibiting the retrieved virtual card from being reallocated.

11. A method for controlling data communication comprising:
establishing a communication connection between a terminal and a management device;
receiving information of a virtual card;
initiating the virtual card for data communication;
sending data usage information of the virtual card to the management device, the data usage information including an amount of data consumed by the terminal through using the virtual card; and
dynamically controlling use of the virtual card currently used by the terminal for data communication according to a control instruction issued by the management device, including:
stopping using the virtual card and returning the virtual card to the management device in response to determining, according to the data usage information, that the amount of data consumed by the terminal through using the virtual card within a certain period of time is zero;
obtaining an amount of remaining data of the virtual card determined according to the data usage information; and
in response to the amount of remaining data of the virtual card being below an allocation-prohibition threshold and higher than a stop-use threshold:
continually using the virtual card for data communication until the terminal releases the virtual card; and
returning the virtual card to the management device in response to the terminal releasing the virtual card, wherein the retrieved virtual card is prohibited from being reallocated.

12. The method according to claim 11, wherein sending the data usage information of the virtual card to the management device includes:
reporting the data usage information of the virtual card consumed by the terminal in accordance with a preset rule.

13. The method according to claim 11, wherein:
the virtual card is a first virtual card, and
controlling the use of the virtual card according to the control instruction further includes:
in response to the amount of remaining data of the first virtual card being below the stop-use threshold:
stopping using the first virtual card and returning the first virtual card to the management device; and
initiating a second virtual card for data communication, wherein an amount of remaining data of the second virtual card is higher than the allocation-prohibition threshold.

14. A management device comprising:
a transceiver;
a memory storing a computer program; and
a processor coupled to the transceiver and the memory, wherein the processor executes the computer program to:
receive, through the transceiver, a request to register a terminal to a communication network;
allocate a virtual card to the terminal for data communication;
acquire, through the transceiver, data usage information of the virtual card, the data usage information including an amount of data consumed by the terminal through using the virtual card; and
dynamically control, through the transceiver, use or reallocation of the virtual card currently used by the terminal for data communication according to the data usage information, including:
in response to determining, according to the data usage information, that the amount of data consumed by the terminal through using the virtual card within a certain period of time is zero:
stopping the terminal from using the virtual card; and
retrieving the virtual card;
acquiring an amount of remaining data of the virtual card according to the data usage information; and
in response to the amount of remaining data of the virtual card being below an allocation-prohibition threshold and higher than a stop-use threshold:

controlling the terminal to continually use the virtual card for data communication until the terminal releases the virtual card at a time before the amount of remaining data of the virtual card reaches the stop-use threshold; and retrieving the virtual card in response to the terminal releasing the virtual card and prohibiting the retrieved virtual card from being reallocated.

15. A terminal comprising:

a transceiver;

a memory storing a computer program; and a processor coupled to the transceiver and the memory, wherein the processor executes the computer program to:

establish a communication connection between the terminal and a management device through the transceiver;

receive information of a virtual card from the management device;

initiate the virtual card for data communication;

send data usage information of the virtual card to the management device; the data usage information including an amount of data consumed by the terminal through using the virtual card; and dynamically control use of the virtual card currently used by the terminal for data communication according to a control instruction issued by the management device, including:

stopping using the virtual card and returning the virtual card to the management device in response to determining, according to the data usage information, that the amount of data consumed by the terminal through using the virtual card within a certain period of time is zero;

obtaining an amount of remaining data of the virtual card determined according to the data usage information; and in response to the amount of remaining data of the virtual card being below an allocation-prohibition threshold and higher than a stop-use threshold:

continually using the virtual card for data communication until the terminal releases the virtual card; and returning the virtual card to the management device in response to the terminal releasing the virtual card, wherein the retrieved virtual card is prohibited from being reallocated.

* * * * *